United States Patent
Nakagawara

(10) Patent No.: US 9,609,232 B2
(45) Date of Patent: Mar. 28, 2017

(54) IMAGING APPARATUS CAPABLE OF NOTIFICATION OF INFORMATION ABOUT A PRESENCE OF A FLICKER AND EXECUTION OF PROCESSING FOR REDUCING AN INFLUENCE OF THE FLICKER, A CONTROL METHOD FOR AN IMAGING APPARATUS, AND A NON-TRANSITORY RECORDING MEDIUM RECORDING A PROGRAM FOR CAUSING A COMPUTER TO EXECUTE A CONTROL METHOD

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/843,642

(22) Filed: Sep. 2, 2015

(65) Prior Publication Data
US 2016/0073001 A1 Mar. 10, 2016

(30) Foreign Application Priority Data
Sep. 8, 2014 (JP) ................................. 2014-182736

(51) Int. Cl.
*H04N 9/73* (2006.01)
*H04N 5/235* (2006.01)

(52) U.S. Cl.
CPC ................................. *H04N 5/2357* (2013.01)

(58) Field of Classification Search
CPC .................................................. H04N 5/2357

USPC ............................................. 348/226.1–228.1
See application file for complete search history.

(56) References Cited

U.S. PATENT DOCUMENTS

| 2010/0053369 A1* | 3/2010 | Nagai | H04N 5/235 348/226.1 |
| 2013/0113959 A1* | 5/2013 | Ho | H04N 5/2357 348/226.1 |
| 2013/0342726 A1* | 12/2013 | Ebina | H04N 5/2357 348/226.1 |

FOREIGN PATENT DOCUMENTS

JP 10-126683 A 5/1998

* cited by examiner

*Primary Examiner* — Kelly L Jerabek
(74) *Attorney, Agent, or Firm* — Canon USA, Inc. I.P. Division

(57) ABSTRACT

At least one imaging apparatus includes a sensor configured to output a signal according to an incident light amount, a calculation unit configured to calculate an evaluation value in regard to a flicker based on the output signal from the sensor, a notification unit configured to notify a user of information about a presence of the flicker based on the evaluation value, and a control unit configured to control processing for reducing an influence of the flicker based on the evaluation value. When the evaluation value is equal to or larger than a first threshold value, the notification unit notifies the user of the information about the presence of the flicker. When the evaluation value is equal to or larger than a second threshold value which is larger than the first threshold value, the control unit performs control to carry out processing for reducing the influence of the flicker.

15 Claims, 9 Drawing Sheets

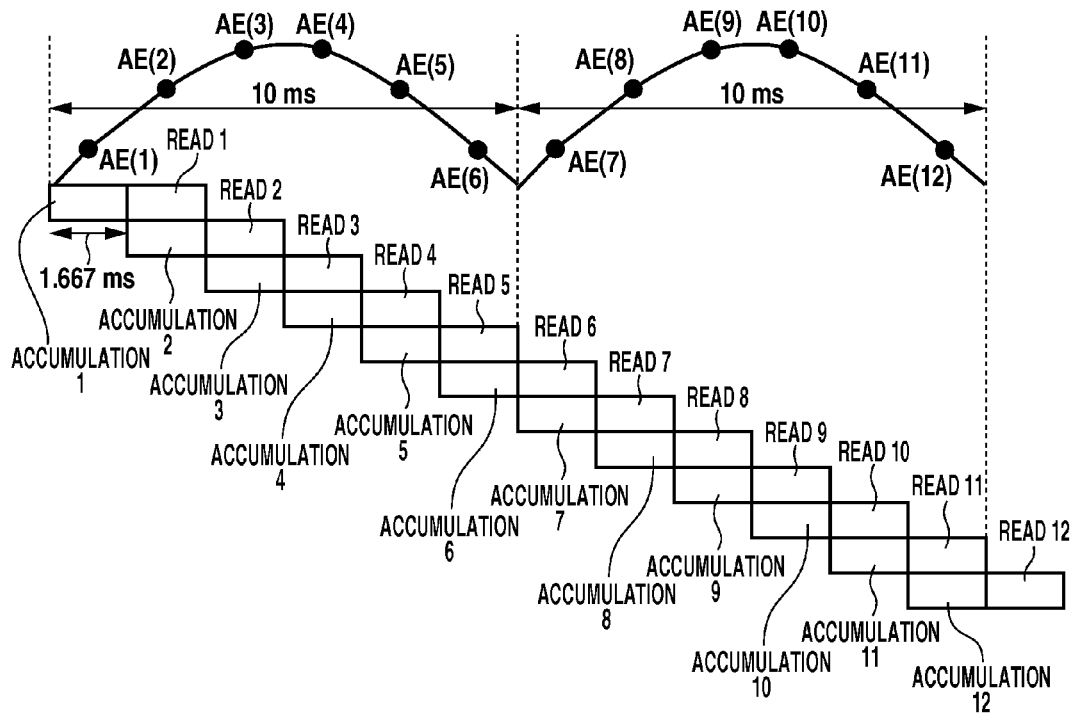
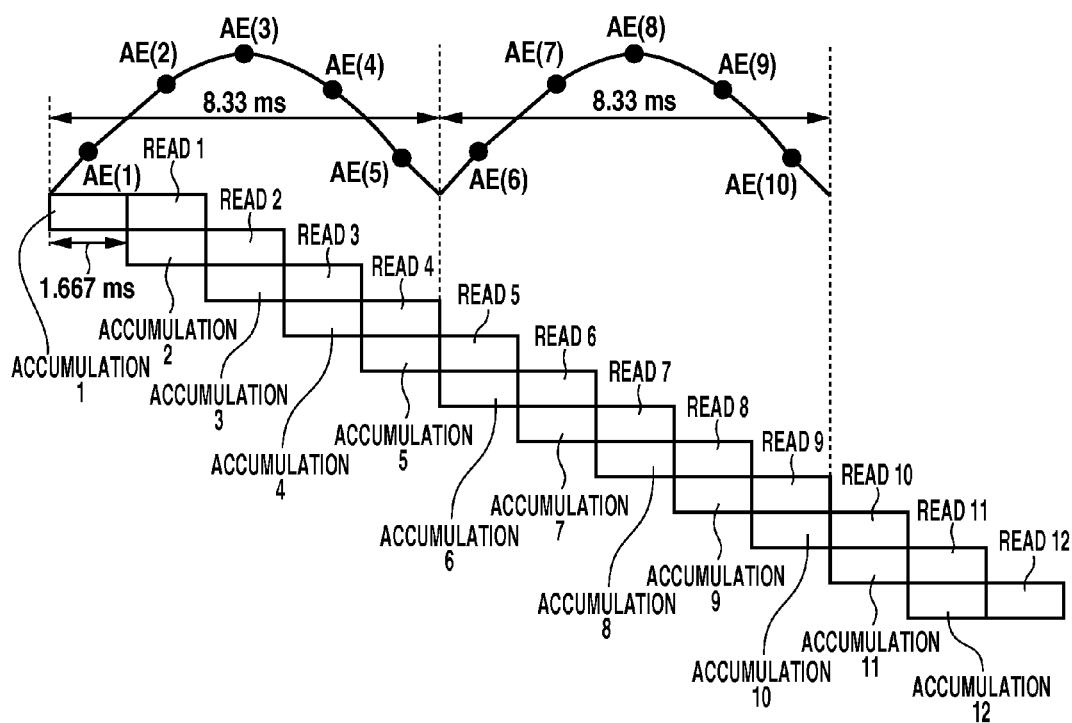

FIG.4

| VERTICAL PIXEL ADDITION NUMBER | READ TIME (1V TIME) |
|---|---|
| 1 (READ ALL PIXELS) | 6.25 ms |
| 2 | 3.63 ms |
| 3 | 2.75 ms |
| 4 | 2.33 ms |
| 5 | 2.09 ms |
| 6 | 1.90 ms |
| 7 | 1.81 ms |
| 8 | 1.73 ms |
| 9 | 1.66 ms |
| 10 | 1.62 ms |

FIG.8

| SHUTTER SPEED | T_ShutterWait |
|---|---|
| 1/125 TO 1/160 | 0 ms |
| 1/161 TO 1/200 | 1.5 ms |
| 1/201 TO 1/250 | 2 ms |
| 1/251 TO 1/500 | 3 ms |
| 1/501 TO 1/1000 | 3.5 ms |
| 1/1001 TO 1/2000 | 3.75 ms |
| 1/2001 OR HIGHER | 4 ms |

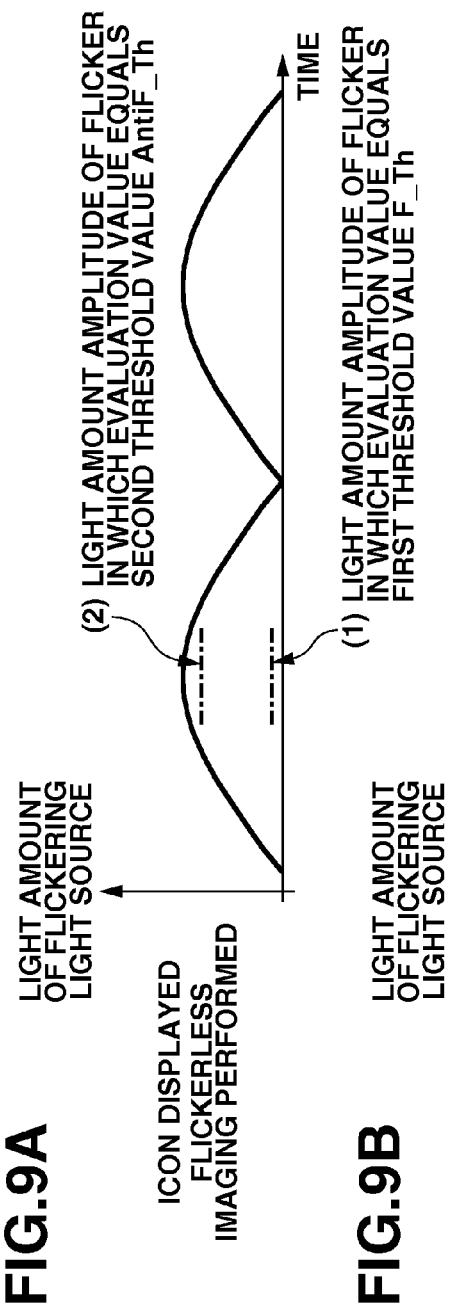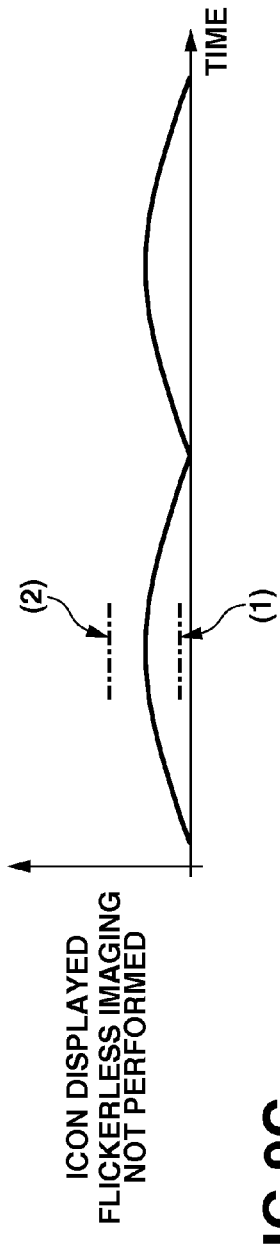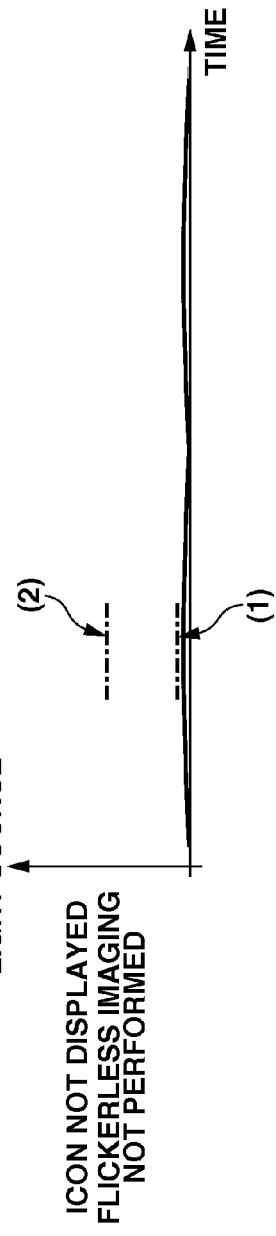

(1)

IMAGING APPARATUS CAPABLE OF NOTIFICATION OF INFORMATION ABOUT A PRESENCE OF A FLICKER AND EXECUTION OF PROCESSING FOR REDUCING AN INFLUENCE OF THE FLICKER, A CONTROL METHOD FOR AN IMAGING APPARATUS, AND A NON-TRANSITORY RECORDING MEDIUM RECORDING A PROGRAM FOR CAUSING A COMPUTER TO EXECUTE A CONTROL METHOD

BACKGROUND OF THE INVENTION

Field of the Invention

The present disclosure relates to an imaging apparatus capable of informing a user that a flicker is occurring under an artificial light source such as a fluorescent light, a control method therefor and one or more storage mediums.

Description of the Related Art

Under the influence of frequency of the commercial power, an artificial light source such as a fluorescent light causes a so-called flicker in which illumination light periodically fluctuates. Conventionally, by using a known technique, a user is informed that a flicker is occurring.

Japanese Patent Application Laid-Open No. 10-126683 discusses an imaging apparatus which is capable of displaying a warning to call an operator's attention when the apparatus determines that a flicker has occurred, and of simultaneously correcting the detected flicker.

SUMMARY OF THE INVENTION

According to an aspect of the present disclosure, at least one imaging apparatus includes a sensor configured to output a signal according to an incident light amount, a calculation unit configured to calculate an evaluation value in regard to a flicker based on the output signal from the sensor, a notification unit configured to notify a user of information about a presence of the flicker based on the evaluation value, and a control unit configured to control processing for reducing an influence of the flicker based on the evaluation value. When the evaluation value is equal to or larger than a first threshold value, the notification unit notifies the user of the information about the presence of the flicker. When the evaluation value is equal to or larger than a second threshold value which is larger than the first threshold value, the control unit performs control to carry out processing for reducing the influence of the flicker.

According to the present disclosure, it is possible to notify a user of information about the presence of a flicker without confusing the user, and simultaneously perform processing for reducing the influence of the flicker.

According to other aspects of the present disclosure, one or more additional imaging apparatuses, one or more control methods therefor and one or more storage mediums are discussed herein. Further features of the present disclosure will become apparent from the following description of exemplary embodiments with reference to the attached drawings.

BRIEF DESCRIPTION OF THE DRAWINGS

FIGS. 3A and 3B illustrate examples of timings of charge accumulation for flicker detection and timings of reading an image signal according to an exemplary embodiment of the present disclosure.

FIG. 4 illustrates an example of a relation between a vertical pixel addition number and a reading time according to an exemplary embodiment of the present disclosure.

FIG. 8 is a table for associating a wait time until the shutter start signal is sent out to instruct a shutter to start traveling, with a shutter speed according to an exemplary embodiment of the present disclosure.

FIGS. 9A, 9B, and 9C illustrate examples of a threshold value for determining flicker icon display and a threshold value for determining whether flickerless imaging should be performed according to an exemplary embodiment of the present disclosure.

DESCRIPTION OF THE EMBODIMENTS

Figure 1:
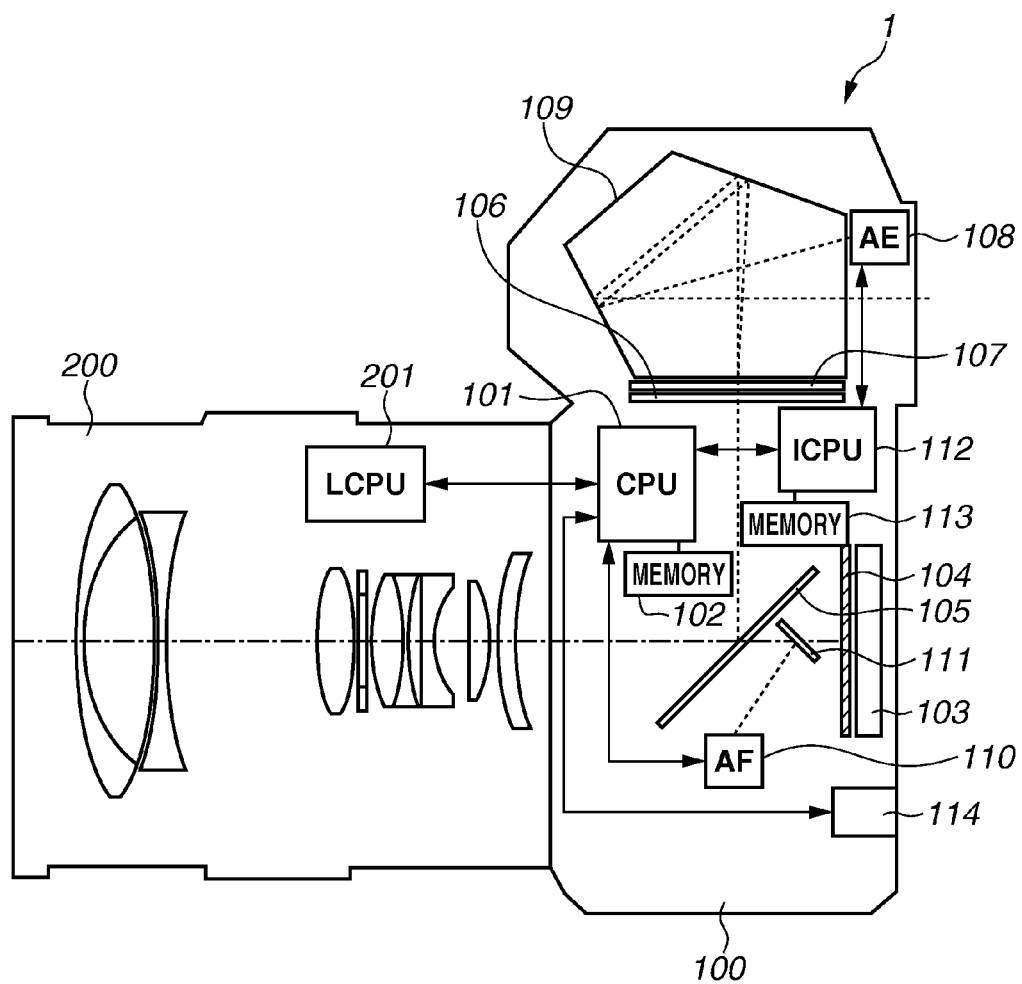
FIG. 1 is a block diagram schematically illustrating a structure of a digital camera as an imaging apparatus according to an exemplary embodiment of the present disclosure.

Exemplary embodiments of the present disclosure will be described in detail below with reference to the accompanying drawings. FIG. 1 is a block diagram schematically illustrating a structure of a digital camera 1 (hereinafter simply referred to as a camera) as an imaging apparatus according to an exemplary embodiment of the present disclosure. The camera 1 according to the present exemplary embodiment is composed of a camera main unit 100 and a lens unit 200. The lens unit 200 is detachably attached to the camera main unit 100. The following describes a state where the lens unit 200 is attached to the camera main unit 100.

The configuration of the camera main unit 100 will be described below. A microcomputer central processing unit 101 (hereinafter simply referred to as a CPU) for camera serves as a control unit for totally controlling each portion of the camera main unit 100. A memory 102 includes a random access memory (RAM) area and a read only memory (ROM) area, and is connected to the CPU 101.

An image sensor 103 is a charge accumulation type image sensor, such as a charge coupled device (CCD) sensor and a complementary metal-oxide semiconductor (CMOS) sensor, including an infrared cut filter and a low-pass filter. The image sensor 103 performs photoelectric conversion on a light flux entering through the lens unit 200 and outputs an image signal.

A shutter 104 is a light-shielding member capable of shielding the image sensor 103 from the light flux entering through the lens unit 200. The shutter 104 is able to operate to enter a light-shielding state in which the image sensor 103 is shielded from the light flux entering through the lens unit 200, and a retracted state in which the light flux entering through the lens unit 200 is guided to the image sensor 103.

A half mirror 105 is an optical member capable of moving to a position for guiding the light flux entering through the lens unit 200 to the image sensor 103 (mirror up state) and a position for guiding the light flux to a light metering sensor 108 (mirror down state). The half mirror 105 is able to change the optical path of the light flux entering through the lens unit 200 to a state for guiding the light flux to the image sensor 103 and a state for guiding the light flux to the light metering sensor 108. When the half mirror 105 is at the position for guiding the light flux to the light metering sensor 108, the light flux entering through the lens unit 200 is focused onto a focusing screen 106.

A display element 107 is a display element using a Polymer Network (PN) liquid crystal. The display element 107 serves as a display unit for displaying an automatic focusing frame (AF frame) for indicating a focus detection area used in automatic focusing control (AF control). The light metering sensor 108 is a charge accumulation type image sensor for accumulating electric charges according to the incident light amount of the CCD or CMOS sensor. The light metering sensor 108 serves as a charge accumulation unit. The image signal output from the light metering sensor 108 enables performing not only light metering but also subject's face detection, object tracking, and flicker detection.

A pentagonal prism 109 is an optical member for guiding the light flux (for example, a dashed line illustrated in FIG. 1) entering through the lens unit 200 reflected by the half mirror 105 to the light metering sensor 108 and an optical finder (not illustrated). The optical finder is disposed together with the pentagonal prism 109 and the light metering sensor 108. A user looks into the optical finder to find the subject's status and various icons displayed on the display element 107.

A focus detection circuit 110 serves as a focus detection unit for performing focus detection for AF control. A part of the light flux entering through the lens unit 200 and having passed the half mirror 105 is guided to the focus detection circuit 110 by the AF mirror 111.

An image CPU (hereinafter referred to as an ICPU) 112 is a CPU for performing drive control for the light metering sensor 108, image processing, and calculations. The ICPU 112 performs various calculations related to the light metering, subject's face detection and object tracking based on the output signal (image signal) from the light metering sensor 108. The ICPU 112 serves as a calculation unit for calculating an evaluation value for detecting a flicker based on the output signal (image signal) from the light metering sensor 108. The ICPU 112 also serves as a flicker detection unit for detecting a flicker based on the relevant evaluation value. A flicker detection method will be described below.

A memory 113 includes a RAM area and a ROM area, and is connected to the ICPU 112. While, in the present exemplary embodiment, the ICPU 112 is provided in addition to the CPU 101, processing performed by the ICPU 112 may be performed by the CPU 101.

An operation unit 114 is an operation unit including a release button used by the user to instruct the camera main unit 100 to start a subject image-pickup preparation operation and to start an imaging operation, and setting buttons for performing various settings on the camera main unit 100. To instruct the camera main unit 100 to start a subject image-pickup preparation operation, the user changes the release button to a SW1 state (by half-pressing the release button). To instruct the camera main unit 100 to start an imaging operation, the user changes the release button to a SW2 state (by fully pressing the release button). The above-described image-pickup preparation operation includes light emission for focus detection (hereinafter referred to as AF auxiliary light emission) by using a flash unit of a stroboscope unit (not illustrated).

The operation unit 114 further includes a power switch used by the user to turn power of the camera main unit 100 ON and OFF, a mode dial used by the user to select an operation mode of the camera main unit 100 from among a plurality of modes, and a touch panel. The user is able to make a setting for displaying an icon related to the presence (detection result) of a flicker (described below) by operating the operation unit 114. As the method for making this setting, for example, the user may set a mode for displaying the icon related to the presence of a flicker. The user may arbitrarily select whether to display the icon related to the presence of a flicker through an ON/OFF setting. The following descriptions will be made on the premise that the user has made in advance a setting for displaying the icon related to the presence of a flicker.

The configuration of the lens unit 200 will be described below. A microcomputer CPU for lens (hereinafter simply referred to as an LCPU) 201 serves as a lens control unit for controlling each portion of the lens unit 200. The LCPU 201 according to the present exemplary embodiment controls a focus lens, a zoom lens, and a diaphragm drive unit, and transmits information about the lens unit 200 to the camera main unit 100 (CPU 101).

Although the camera 1 according to the present exemplary embodiment is a so-called interchangeable-lens imaging apparatus including the camera main unit 100 and the lens unit 200 which are both independent units, the configuration is not limited thereto. For example, in the camera 1 according to the present exemplary embodiment, the camera main unit 100 and the lens unit 200 may be integrally configured. In this case, the CPU 101 may perform various control related to the lens unit 200 without installing the LCPU 201 of the lens unit 200.

Figure 2:
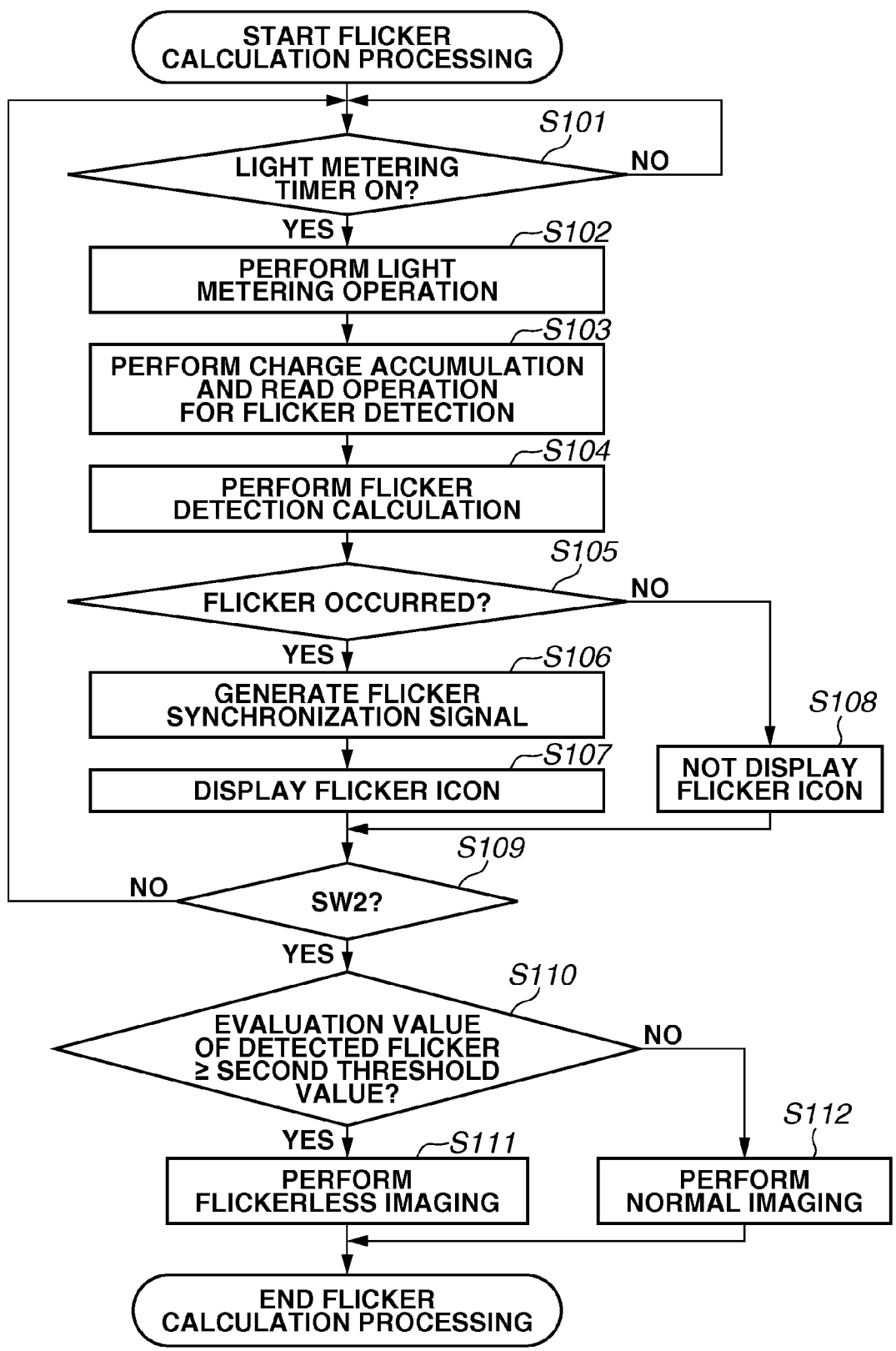
FIG. 2 is a flowchart illustrating operations for detecting a flicker performed by the digital camera as an imaging apparatus according to an exemplary embodiment of the present disclosure.

Operations related to flicker detection will be described below with reference to FIG. 2. FIG. 2 is a flowchart illustrating operations related to flicker detection performed by the camera 1 as an imaging apparatus according to an exemplary embodiment of the present disclosure. When the user turns ON power of the camera main unit 100 by operating the power switch, in step S101, the ICPU 112 determines whether a light metering timer is turned ON. When the light metering timer is turned OFF (NO in step S101), the ICPU 112 repeats the relevant processing until the light metering timer is turned ON. The above-described light metering timer is turned ON when power of the camera main unit 100 is turned ON or when the release button is changed to the SW1 state by a user's operation. The light metering timer is turned OFF when the camera main unit 100 is not operated for a predetermined time period.

When the light metering timer is determined to be turned ON (YES in step S101), then in step S102, the ICPU 112 performs the light metering operation by using the light metering sensor 108. In the light metering operation, the ICPU 112 performs charge accumulation by using the light metering sensor 108 and image signal readout from the light metering sensor 108. Then, the ICPU 112 performs a calculation related to light metering (hereinafter referred to as a light metering calculation) based on the read image signal to acquire a photometric value.

In the light metering operation, it is necessary, even under a flickering light source, to prevent variation of the photometric value because of the influence of the light amount change of the flickering light source. Therefore, it is desirable to set the accumulation time of the light metering sensor 108 to almost an integral multiple of the flickering cycle.

In this case, the frequency at which the light amount of the flickering light source changes (hereinafter referred to as a flicker frequency) is twice the commercial power frequency. Therefore, in areas where the commercial power frequency is 50 Hz, the flicker frequency is 100 Hz and the cycle of the light amount change (hereinafter referred to as a light amount change cycle) of the flickering light source is 10 milliseconds (ms) which is a reciprocal of the flicker frequency. Likewise, in areas where the commercial power frequency is 60 Hz, the flicker frequency is 120 Hz and the light amount change cycle is 8.33 ms which is a reciprocal of the flicker frequency.

To deal with the two different flicker frequencies, for example, the accumulation time of the light metering sensor 108 is set to 9 ms which is approximately equal to an average value of 10 ms and 8.33 ms. In this setting, the accumulation time of the light metering sensor 108 is approximately equal to one cycle of light amount change whether the flickering light source operates on the 50- or 60-Hz commercial power frequency. This enables acquiring a stable photometric value even under a flickering light source.

Further, based on the acquired photometric value, the CPU 101 sets an aperture diaphragm value Av (exposure control value), a shutter speed (exposure time period) Tv, and an International Organization for Standardization (ISO) speed (imaging sensitivity) Sv. More specifically, the CPU 101 sets these values (Av, Tv, and Sv) based on a program diagram prestored in the memory 102.

In step S103, as illustrated in FIGS. 3A and 3B, the CPU 101 performs charge accumulation for flicker detection by using the light metering sensor 108, and image signal readout from the light metering sensor 108 a plurality of times. FIGS. 3A and 3B illustrate examples of timing of charge accumulation for flicker detection and timing of image signal readout according to an exemplary embodiment of the present disclosure. The CPU 101 successively performs charge accumulation and image signal readout 12 times at a frame rate of 600 frames per second (fps), i.e., at intervals of about 1.667 ms. The 600 fps frame rate is equal to the least common multiple of the presumed flicker frequencies (100 Hz and 120 Hz). Since charge accumulation is performed at the 600-fps frame rate 12 times, charge accumulation is totally performed in a 20-ms time period. This time period includes two light amount change cycles of the flickering light source whether at the 50- or 60-Hz commercial power frequency.

A method for driving the light metering sensor 108 at the 600-fps frame rate (at 1.667-ms intervals) will be described below. In the present exemplary embodiment, the CPU 101 performs not only light metering but also subject's face detection, object tracking, and flicker detection based on image signals output from the light metering sensor 108. To perform subject's face detection with sufficient accuracy, for example, the number of pixels of the light metering sensor 108 needs to correspond to the number of pixels of the Quarter Video Graphics Array (QVGA) to some extent. To read all of pixel signals of an image sensor having the number of pixels for enabling subject's face detection with sufficient accuracy at a frame rate of 600 fps or above, a complicated circuit configuration is required, which leads to a cost increase.

Therefore, the CPU 101 reads all of pixel signals for performing subject's face detection, and performs pixel addition readout and thinning readout on the image signals for performing flicker detection to adjust the frame rate to 600 fps (at 1.667-ms intervals).

When using a CCD sensor as the light metering sensor 108, it is desirable to perform pixel addition readout in which pixel signals are added and read out, to decrease the number of read lines in a pseudo way to shorten the reading time. For example, performing vertical pixel addition by using a CCD sensor having a pixel arrangement in a striped form provides an effect of shortening the reading time, as illustrated in FIG. 4. FIG. 4 illustrates an example of a relation between the vertical pixel addition number and the reading time according to an exemplary embodiment of the present disclosure. The example describes a CCD sensor having a reading time of 6.25 ms when reading all of pixel signals without adding pixel signals (vertical pixel addition number=1). The CCD sensor having features as illustrated in FIG. 4 performs 9-pixel addition to provide a reading time of 1.66 ms, achieving a frame rate of about 600 fps. The number of pixels in the vertical direction in this case is one-ninth of that in the case of image signal readout without adding pixel signals. However, since photometric values are simply compared between image signals in flicker detection, even image signals having reduced number of pixels in the vertical direction causes no problem. When using a CMOS sensor as the light metering sensor 108, it is desirable to adjust the total time of charge accumulation and signal readout so as to be approximately equal to a time period of 1.667 ms by performing what is called thinning readout in which limited number of horizontal lines are subjected to pixel signal readout.

The method for driving the light metering sensor 108 at a frame rate of about 600 fps (at intervals of about 1.667 ms) is as above described. The above-described accumulation and read cycle of the light metering sensor 108 is only an example. The frame rate may not be about 600 fps (at intervals of about 1.667 ms). For example, since a longer accumulation time is effective in a lower illumination environment, the accumulation time for one charge accumulation may be made longer than about 1.667 ms, and the frame rate may be made lower than 600 fps. Alternatively, since a shorter accumulation and read cycle provides a shorter time required for flicker detection, the accumulation time for one charge accumulation may be shorter than about 1.667 ms. In this case, the vertical pixel addition number may be made such that the reading time becomes shorter than 1.66 ms to make the frame rate higher than 600 fps. The relation between the vertical pixel addition number and the reading time illustrated in FIG. 4 is only an example. However, the difference between the accumulation/read cycle of the light metering sensor 108 and the light amount change cycle of the flickering light source increases as deviation of the frame rate from 600 fps is increased. Therefore, a frame rate of 600 fps±1 to 2% or less is desirable. More specifically, it is desirable that the light metering cycle of the light metering sensor 108 is approximately equal to the reciprocal of the least common multiple of a frequency which is twice the first commercial power frequency and a frequency which is twice the second commercial power frequency.

Referring to FIG. 2 again, in step S103, the ICPU 112 performs the flicker detection calculation based on read image signals. In the flicker detection calculation, operations related to "flicker environment determination" and "flicker peak timing calculation" are performed. The relevant operations will be described in detail below.

(Determination of Flicker Environment)

In step S104, based on output signals (image signals) acquired through charge accumulation in the light metering sensor 108, the ICPU 112 determines whether a flicker has occurred (detects a flicker). FIG. 3A illustrates an example of charge accumulation timing, image signal readout timing, and photometric value transition in the case of the 50-Hz commercial power frequency. Referring to FIG. 3A, "Accumulation n" refers to the n-th charge accumulation, "Read n" refers to readout for "Accumulation n", and "AE(n)" refers to a photometric value acquired from the result of "Read n." Although one photometric value is acquired for each accumulation, the light amount of the flickering light source is not constant even during the accumulation period. Therefore, the photometric value acquired for each accumulation is regarded as a value corresponding to the light amount of the flickering light source at the center of each accumulation period.

As described above, the light amount change cycle of the flickering light source operating on the 50-Hz commercial power frequency is about 10 ms. Therefore, since 10/1.667≈6, charge accumulation is performed at such timing that the light amount of the flickering light source is approximately the same at a 6-times interval as illustrated in FIG. 3A. More specifically, a relation "AE(n)≈AE(n+6)" is given.

Likewise, the light amount change cycle of the flickering light source operating on the 60-Hz commercial power frequency is about 8.33 ms. Therefore, since 8.33/1.667≈5, charge accumulation is performed at such timing that the light amount of the flickering light source is approximately the same at a 5-times interval as illustrated in FIG. 3B. More specifically, a relation "AE(n)≈AE(n+5)" is given.

Meanwhile, if a light source without light amount change is used, AE(n) is approximately constant regardless of n. Accordingly, based on a plurality of photometric values acquired by performing charge accumulation for flicker detection, the ICPU 112 calculates evaluation values by using the following formulas (1) and (2).

$$F50 = \sum_{n=1}^{6} |AE(n) - AE(n+6)| \quad (1)$$

$$F60 = \sum_{n=1}^{6} |AE(n) - AE(n+5)| \quad (2)$$

The ICPU 112 calculates an evaluation value F50 by using the formula (1) and calculates an evaluation value F60 by using the formula (2). The ICPU 112 compares the evaluation values F50 and F60 with a first threshold value (a threshold value for determining flicker icon display) F_th to detect a flicker.

More specifically, when "F50<F_th" and "F60<F_th", it can be said that all of the photometric values acquired by performing charge accumulation for flicker detection are approximately the same. In this case, the ICPU 112 determines that a flicker has not occurred. When "F50<F_th" and "F60≥F_th", it can be said that a plurality of the photometric values acquired by performing charge accumulation for flicker detection is approximately the same at a 6-times interval and is not approximately the same at a 5-times interval. Therefore, the ICPU 112 determines that a flicker having a light amount change cycle of 10 ms has occurred (under a flickering light source operating on the 50-Hz commercial power frequency). When "F50≥F_th" and "F60<F_th", it can be said that a plurality of the photometric values acquired by performing charge accumulation for flicker detection is approximately the same at the 5-times interval and is not approximately the same at the 6-times interval. Therefore, the ICPU 112 determines that a flicker having a light amount change cycle of 8.33 ms has occurred (under a flickering light source operating on the 60-Hz commercial power frequency).

There may be a case where, if the movement of the imaging apparatus such as panning or the movement of the subject occurs during execution of charge accumulation for flicker detection, the photometric values largely change resulting in a condition "F50≥F_th" and "F60≥F_th." In this case, the ICPU 112 compares the evaluation value F50 with the evaluation value F60 to perform flicker detection. More specifically, when "F50≥F_th" and "F60≥F_th" and "F50<F60", the ICPU 112 determines that a flicker having a light amount change cycle of 10 ms has occurred (under a flickering light source operating on the 50-Hz commercial power frequency). On the other hand, when "F50≥F_th" and "F60≥F_th" and "F50>F60", the ICPU 112 determines that a flicker having a light amount change cycle of 8.33 ms has occurred (under a flickering light source operating on the 60-Hz commercial power frequency). When "F50≥F_th" and "F60≥F_th" and "F50=F60", the ICPU 112 is unable to determine the light amount change cycle of the flickering light source and therefore may determine that a flicker has not occurred or that flicker detection is not possible. Although, when "F50≥F_th" and "F60≥F_th", the ICPU 112 determines the light amount change cycle of the flickering light source, the ICPU 112 may perform charge accumulation for flicker detection again because the flicker detection accuracy is low in this case.

Figure 5:
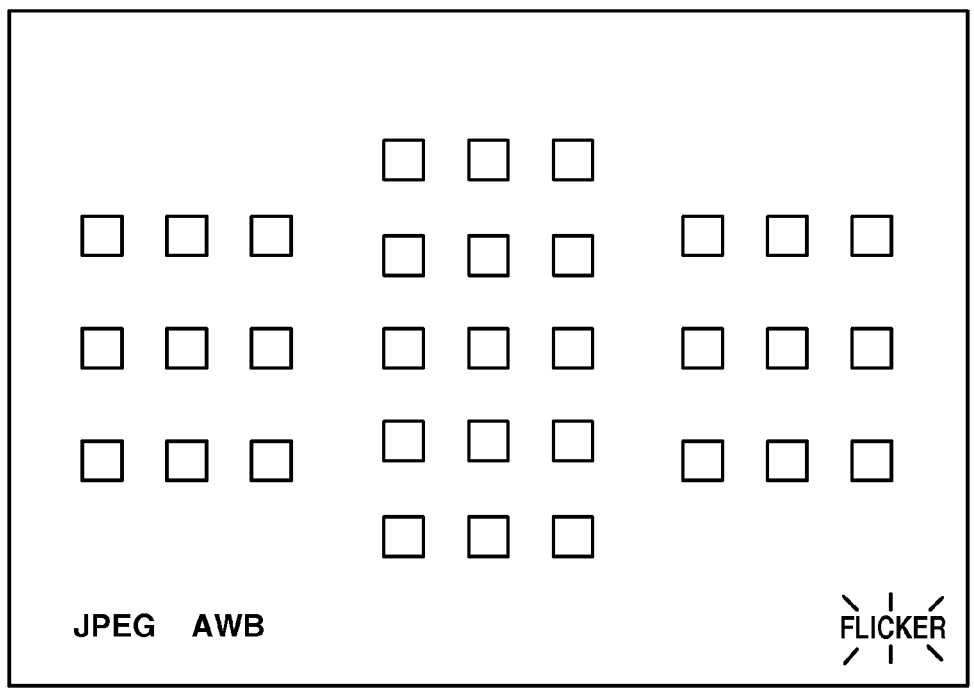
FIG. 5 illustrates an example of an icon related to the presence of a flicker according to an exemplary embodiment of the present disclosure.

The above-described first threshold value F_Th is also a threshold value for determining whether to display the icon related to the presence of a flicker (result of flicker detection) on the display element 107. The above-described icon is a "Flicker" icon which can be displayed on the display element 107, as illustrated in FIG. 5. Hereinafter, the icon is referred to as a flicker icon. FIG. 5 illustrates an example of the icon related to the presence of a flicker according to an exemplary embodiment of the present disclosure.

Under a flickering light source, the user looks into an optical finder (not illustrated) to check whether the flicker icon is displayed to determine whether a flicker has occurred. More specifically, by switching between the state where the flicker icon is displayed (display state) and the state where the flicker icon is not displayed (non-display state) according to the result of flicker detection, the user can be suitably notified of whether a flicker has occurred in the imaging environment.

The above-described first threshold value F_Th is a value prestored in the memory 102 or 113. The first threshold value F_Th may be such a value that, when a subject is captured under a flickering light source, enables the user to detect that the flicker has occurred regardless of the amplitude of the flicker. This configuration enables uniformly displaying the flicker icon regardless of the amplitude of the flicker under a flickering light source. Thus, frequent switching between the display state and the non-display state of the flicker icon can be prevented. More specifically, the flicker icon can be displayed without confusing the user.

(Calculation of Flicker Peak Timing)

Figure 6:
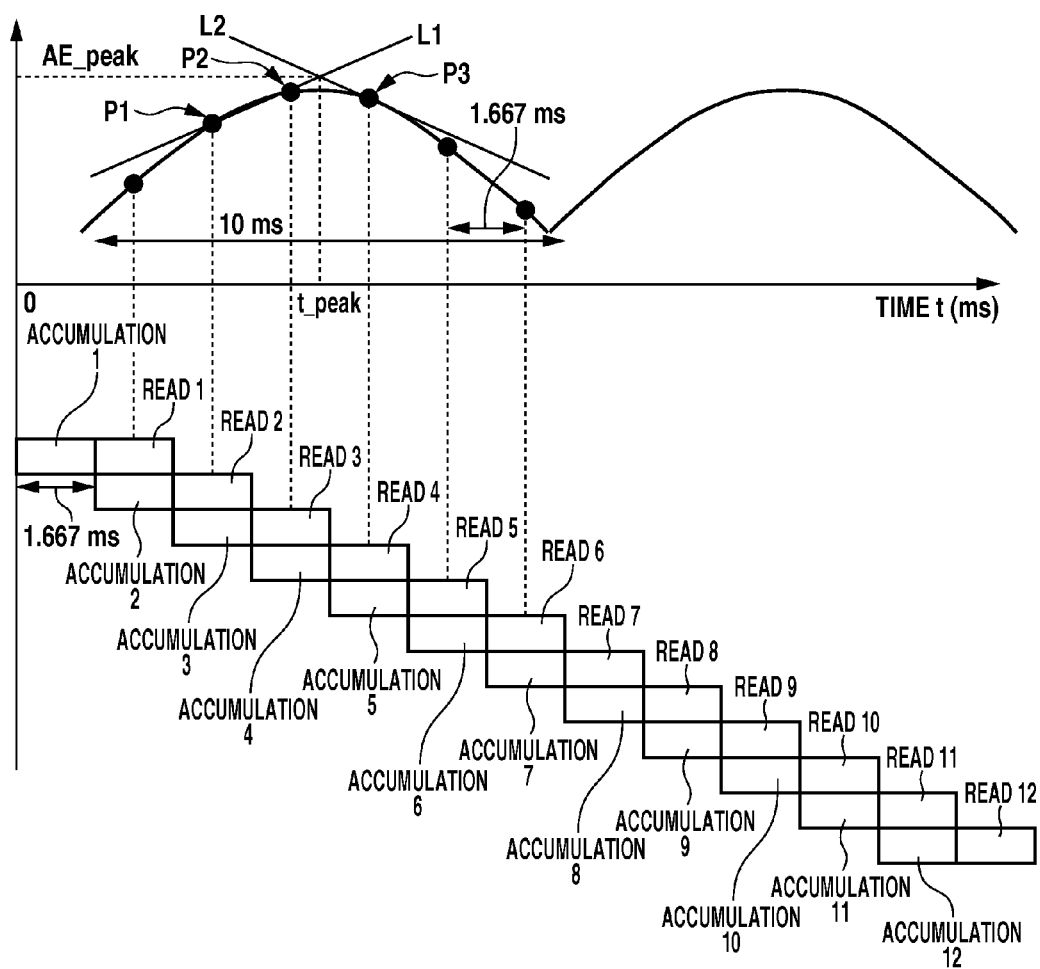
FIG. 6 illustrates an example of a method for calculating timing of a light amount peak of a flickering light source as an example of timing of a flicker which is a feature point according to an exemplary embodiment of the present disclosure.

In step S104, the ICPU 112 acquires timing of a flicker feature point under a flickering light source. FIG. 6 illustrates an example of a method for calculating timing of a light amount peak of the flickering light source as an example of the timing of a flicker feature point according to an exemplary embodiment of the present disclosure.

Of points AE(1) to AE(12), a point where the maximum value is acquired is referred to as a point P2 (t(m), AE(m)), the primarily preceding point of the light metering result is referred to as a point P1 (t(m−1), AE(m−1)), and the following point of the light metering result is referred to as a point P3 (t(m+1), AE(m+1)). As illustrated in FIG. 6, the ICPU 112 acquires a straight line L1=at+b passing through a point AE(m−1) or AE(m+1) whichever smaller (the point P1 in the example illustrated in FIG. 6) and the point P2. The ICPU 112 further acquires a straight line L2 having an inclination of −a and passing through the point AE(m−1) or AE(m+1) whichever larger (the point P3 in the example illustrated in FIG. 6). By acquiring the intersection of the straight lines L1 and L2, a peak timing t_peak and a peak photometric value AE_peak corresponding to the light amount at the peak timing can be calculated assuming that charge accumulation for flicker detection is started at 0 ms.

FIG. 6 illustrates a method for calculating timing at which the light amount reaches a maximum (peak) value in a light amount variation of a flicker as an example of a method for calculating timing of a flicker feature point. However, timing at which the light amount reaches a minimum (bottom) value may also be calculated.

Referring back to FIG. 2, in step S105, based on the result of the flicker detection calculation (result of flicker detection) acquired in step S104, the CPU 101 determines whether a flicker has occurred. When the CPU 101 determines that a flicker has not occurred (NO in step S105), the processing proceeds to step S108. On the other hand, when the CPU 101 determines that a flicker has occurred (YES in step S105), the processing proceeds to step S106.

Figure 7:
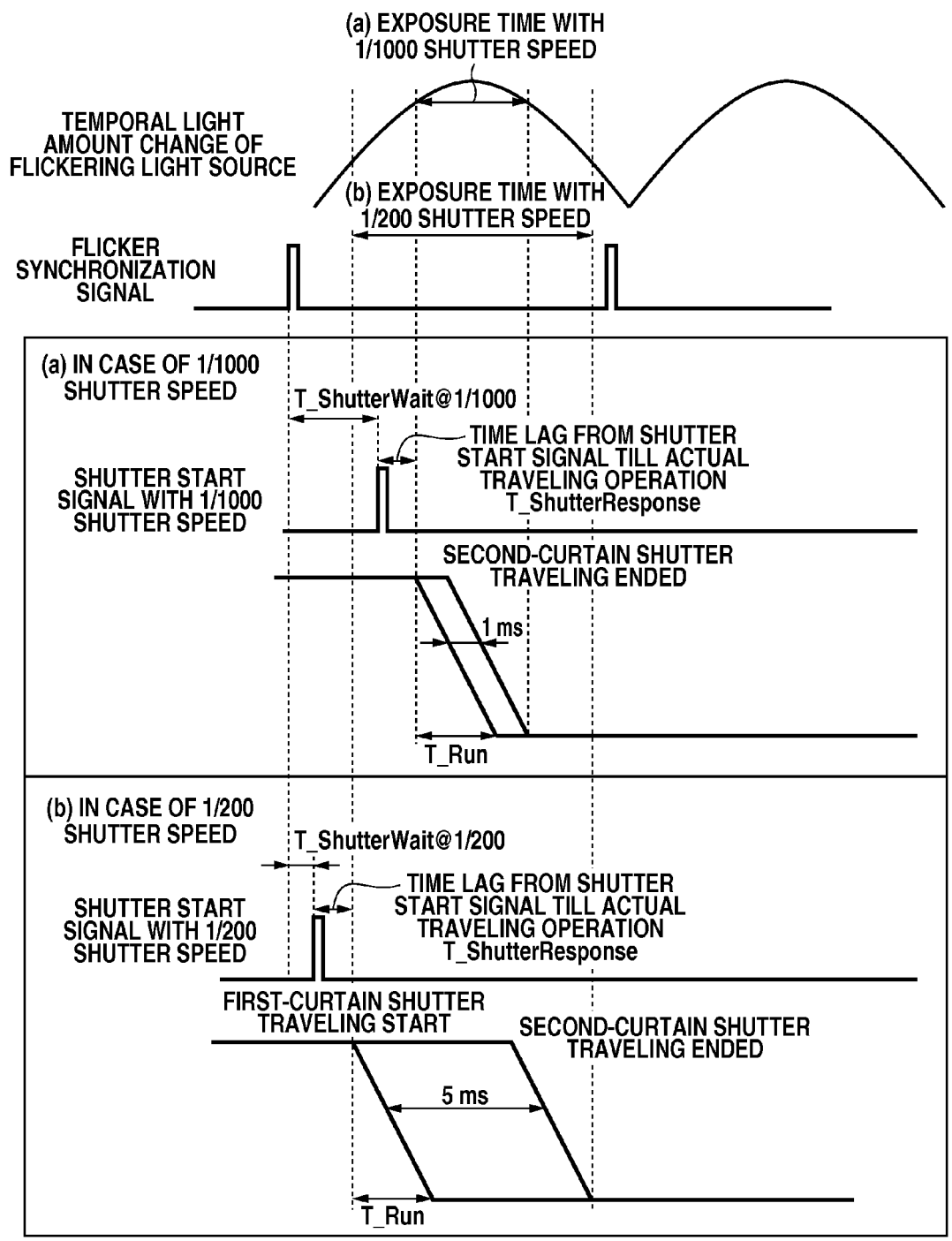
FIG. 7 illustrates examples of a relation between a light amount change of the flickering light source and generation timings of a flickering synchronization signal and a shutter start signal according to an exemplary embodiment of the present disclosure.

In step S106, the CPU 101 generates a flickering synchronization signal based on the flicker frequency and the timing of the light amount peak of the flickering light source acquired in step S104. The flickering synchronization signal is a signal generated for each light amount change cycle of the flickering light source, and synchronized with predetermined timing in regard to a light amount change of the flickering light source, as illustrated in FIG. 7. FIG. 7 illustrates an example of a relation between the light amount change of the flickering light source and generation timings of the flickering synchronization signal and the shutter start signal according to an exemplary embodiment of the present disclosure.

As illustrated in FIG. 7, there is a time lag T_ShutterResponse from when the shutter start signal is triggered till when the shutter 104 actually travels to start exposure of the first line of the imaging area of the image sensor 103. There is another time lag T_Run from when exposure of the first line of the imaging area of the image sensor 103 is started till when exposure of the last line is started. To simultaneously start exposure of all of the imaging areas of the image sensor 103, it is necessary is to set T_Run=0.

A generation timing t_Flicker of the flickering synchronization signal is given by the following formula (3) assuming that charge accumulation for flicker detection is started at 0 ms.

$$t\_Flicker = t\_peak - T\_ShutterResponse - (T\_Run + TVmax)/2 + T \times n \quad (3)$$

The light amount change cycle T of the flickering light source, and the peak timing t_peak when charge accumulation for flicker detection is started at 0 ms are calculated in step S103. n indicates a natural number, and TVmax indicates a preset shutter speed which serves as a threshold value for determining whether to perform shutter control for reducing the influence of a flicker.

When the shutter speed is lower than 1/100 seconds, the CPU 101 performs exposure in a time period equal to or longer than one light amount change cycle of the flickering light source, resulting in a reduced influence of a flicker. Even if the shutter speed provides an exposure time period which is shorter than one light amount change cycle of the flickering light source, the influence of a flicker is considered to be small if the exposed time period is close to one light amount change cycle of the flickering light source. Therefore, in the present exemplary embodiment, the CPU 101 performs shutter control for reducing the influence of a flicker when the shutter speed is higher than 8 ms. In this case, TVmax=1/125 (seconds).

The CPU 101 sets a wait time T_ShutterWait from when the flickering synchronization signal is triggered till when the shutter start signal is triggered to instruct the shutter 104 to start traveling. The CPU 101 changes the wait time T_ShutterWait for each shutter speed, and performs control so that timing of a small light amount change of the flickering light source comes to the center of the time period from when exposure of the first line of the imaging area of the image sensor 103 is started till when exposure of the last line thereof is ended. For example, the CPU 101 sets the wait time T_ShutterWait based on the formula (4).

$$T\_ShutterWait = (TVmax - TV)/2 \quad (4)$$

where TV<1/125.

By setting the wait time T_ShutterWait as described above, control can be carried out such that timing of a light amount peak of the flickering light source comes to the center of the time period from when exposure of the first line of the imaging area of the image sensor 103 is started till when exposure of the last line thereof is ended. FIG. 8 illustrates a table for associating a wait time till the time when the shutter start signal is triggered to instruct the shutter 104 to start traveling with the shutter speed according to an exemplary embodiment of the present disclosure. The table as illustrated in FIG. 8 may be prestored in the memory 102.

In the above-described example, in step S104, the CPU 101 calculates timing of a light amount peak of the flickering light source and sets the generation timing of the flickering synchronization signal based on the timing of the light amount peak of the flickering light source. However, when calculating timing of a bottom value of the light amount of the flickering light source in step S104, a generation timing of the flickering synchronization signal may be set based on the calculated timing of the bottom value of the light amount of the flickering light source.

Referring back to FIG. 2, in step S107, the CPU (notification unit) 101 displays the flicker icon on the display element 107 to notify the user of information about the presence of a flicker. When the flicker icon has already been displayed in the previous flicker calculation processing, the CPU 101 maintains display of the flicker icon on the display element 107. When the CPU 101 determines that a flicker has not occurred (NO in step S105), then in step S108, the CPU 101 performs control not to display the flicker icon on the display element 107. When the flicker icon has already been displayed in the previous flicker calculation processing, the CPU 101 deletes (display of) the flicker icon from the display element 107.

In step S109, the CPU 101 determines whether the switch SW2 for instructing to start the imaging operation is turned ON by the user operating the release button. When the CPU 101 determines that the switch SW2 is not turned ON (NO in step S109), the processing returns to step S101. Then, the CPU 101 repeats a series of operations in steps S101 to S108. Through this configuration, the light amount change cycle of the flickering light source, the timing of the light amount peak of the flickering light source, and the state of the flicker icon are updated to the latest settings.

If a series of operations in steps S101 to S108 is repetitively performed, for example, at intervals of about 100 ms, the difference in the light amount change cycle can be suppressed. More specifically, even if there is a fluctuation of about ±0.4 Hz in the light amount change cycle of the flickering light source, the difference in the light amount change cycle in 100 ms is at most about ±0.4 ms. Therefore, whenever the switch SW2 is turned ON, the CPU 101 is able to perform shutter control for reducing the influence of a flicker with sufficient accuracy.

(Determination of Flickerless Imaging Execution)

In step S110, the CPU (control unit) 101 determines whether to perform flickerless imaging by using the evaluation values F50 and F60 acquired in the flicker detection calculation in step S104. In the present exemplary embodiment, when the detected flicker is larger than a predetermined threshold value, based on the result of flicker detection, the CPU 101 automatically performs the imaging operation (flickerless imaging) while reducing an influence of a flicker.

More specifically, the CPU 101 compares the previously acquired evaluation values F50 and F60 with a second threshold value AntiF_Th (a threshold value for determining whether flickerless imaging should be performed) to determine whether flickerless imaging should be performed as follows.

When "F50<AntiF_Th" and "F60<AntiF_Th", the CPU 101 determines that the level of a flicker having occurred is not a level at which flickerless imaging is possible. Then, the CPU 101 instructs to perform flickerless imaging. When "F50<AntiF_Th" and "F60 AntiF_Th", the CPU 101 gives instructions to perform imaging for reducing the influence of a flicker (under a flickering light source operating on the 50-Hz commercial power frequency) having a light amount change cycle of 10 ms. When "F50≥AntiF_Th" and "F60<AntiF_Th", the CPU 101 gives instructions to perform imaging for reducing the influence of a flicker (under a flickering light source operating on the 60-Hz commercial power frequency) having a light amount change cycle of 8.33 ms.

Further, there may be a case where, if the movement of the imaging apparatus such as panning or the movement of the subject occurs during execution of flickerless imaging, the photometric values largely change resulting in a condition "F50≥AntiF_th" and "F60 AntiF_th." In this case, the CPU 101 compares the evaluation value F50 with the evaluation value F60 to determine a light amount change cycle according to which flickerless imaging is to be performed.

More specifically, when "F50≥AntiF_Th" and "F60≥AntiF_Th" and "F50<F60", the CPU 101 performs imaging for reducing the influence of a flicker having a light amount change cycle of 10 ms. When "F50≥AntiF_Th" and "F60≥AntiF_Th" and "F50>F60", the CPU 101 performs imaging for reducing the influence of a flicker having a light amount change cycle of 8.33 ms. When "F50 AntiF_Th" and "F60≥AntiF_Th" and "F50=F60", the CPU 101 determines that flickerless imaging is not possible and therefore does not perform flickerless imaging.

The second threshold value AntiF_Th is a value prestored in the memory 102 or 113. The second threshold value AntiF_Th only needs to be a value which prevents imaging degraded under the influence of a flicker when an image of the subject is captured under a flickering light source.

To perform flickerless imaging, the shutter speed and the exposure start timing need to be changed according to the detected flicker cycle. In this case, the subject may be captured under conditions not intended by the user (i.e., an image not intended by the user may be acquired). Therefore, when the influence of a flicker on an image to be shot is small, it is desirable not to perform flickerless imaging if possible. On the other hand, according to the above-described configuration, flickerless imaging is performed only upon detection of a flicker having such an amplitude that an image degraded under the influence of a flicker will be acquired. Therefore, the camera 1 according to the present exemplary embodiment is able to prevent unnecessary execution of flickerless imaging.

The above-described first and second threshold values will be described below with reference in FIGS. 9A to 9C. FIGS. 9A to 9C illustrate examples of a threshold value for determining flicker icon display and a threshold value for determining whether flickerless imaging should be performed according to an exemplary embodiment of the present disclosure. Referring to FIGS. 9A to 9C, the vertical axis indicates the light amount of a flicker and the horizontal axis indicates time. FIG. 9A illustrates an example of a case where a flicker (an amplitude of the flickering light source) is large. FIG. 9B illustrates an example of a case where a flicker (the amplitude of the flickering light source) is small. FIG. 9C illustrates an example of a case where a flicker has not occurred. One-point chain lines illustrated in FIGS. 9A to 9C indicate two different cases: <1> the light amount amplitude of the flickering light source in which the evaluation value is equal to the first threshold value F_Th, and <2> the light amount amplitude of the flickering light source in which the evaluation value is equal to the second threshold value AntiF_Th. As illustrated in FIGS. 9A to 9C, the amplitude of the detected flicker can be determined by comparing the detected light amount amplitude of the flickering light source (solid lines illustrated in FIGS. 9A to 9C) with the amplitude of the one-point chain lines (as illustrated in cases <1> and <2>).

As illustrated in FIG. 9A, when the light amount amplitude of the flickering light source is comparatively large, the light amount amplitude of the flickering light source is equal to or larger than the light amount amplitudes illustrated in cases <1> and <2>. In this case, the amplitude of the evaluation value (F50 or F60) in regard to the detected flicker is equal to or larger than the first threshold value F_Th and the second threshold value AntiF_Th. In the present exemplary embodiment, the flicker icon is displayed and flickerless imaging is performed in this state.

On the other hand, when the light amount amplitude of the flickering light source is comparatively small as illustrated in FIG. 9B, the light amount amplitude of the flickering light source is equal to or larger than the light amount amplitude illustrated in case <1>, and is smaller than the light amount amplitude illustrated in case <2>. In this case, the amplitude of the evaluation value (F50 or F60) in regard to the detected flicker is equal to or larger than the first threshold value F_Th, and is smaller than the second threshold value AntiF_Th. In the present exemplary embodiment, the flicker icon is displayed and flickerless imaging is not performed in this state.

When a flicker has not occurred as illustrated in FIG. 9C, the light amount amplitude of the flickering light source is smaller than the light amount amplitudes illustrated in cases <1> and <2>. In this case, the amplitude of the evaluation value (F50 or F60) in regard to the detected flicker is smaller than the first threshold value F_Th and the second threshold value AntiF_Th. In the present exemplary embodiment, the flicker icon is not displayed and flickerless imaging is not performed in this state.

In the above-described present exemplary embodiment, the first threshold value F_Th for starting display of the flicker icon, and the second threshold value AntiF_Th for performing flickerless imaging are respectively set to different values. Further, the first threshold value F_Th is set to a value smaller than the second threshold value AntiF_Th. With this configuration, the flicker icon can be easily displayed when a flicker has occurred, and flickerless imaging only when a flicker affecting an image has occurred. Therefore, when a flicker is detected, the camera 1 (the camera main unit 10) according to the present exemplary embodiment is able to prevent unnecessary execution of flickerless imaging while notifying the user that a flicker has occurred.

Referring back to FIG. 2, when the CPU 101 determines that the amplitude of the evaluation value (F50 or F60) of the detected flicker is equal to or larger than the second threshold value AntiF_Th (YES in step S110), then in step S111, the CPU 101 performs flickerless imaging. In step S111, the CPU 101 generates the shutter start signal with a delay behind the previously generated flickering synchronization signal by the wait time T_ShutterWait corresponding to the previously determined shutter speed. Then, the CPU 101 drives the shutter 104 in response to the generated shutter start signal to capture the subject.

When the CPU 101 determines that the amplitude of the evaluation value (F50 or F60) of the detected flicker is smaller than the second threshold value AntiF_Th (NO in step S110), then in step S112, the CPU 101 performs the normal imaging operation (normal imaging). More specifically, in order to reduce the influence of a flicker, the CPU 101 captures an image of the subject under predetermined exposure conditions without changing exposure conditions.

When capturing of the subject is completed in step S111 or S112, the CPU 101 ends the current flicker calculation processing and then start the next flicker calculation processing. More specifically, the camera 1 according to the present exemplary embodiment repeatedly performs flicker detection at predetermined intervals, and, according to the result of flicker detection, notifies the user of information about the presence of the relevant flicker and performs imaging for reducing the influence of the detected flicker.

As described above, the camera 1 according to the present exemplary embodiment sets the first threshold value F_Th for starting display of the flicker icon to a value smaller than the second threshold value AntiF_Th for performing flickerless imaging. With this configuration, if a flicker has occurred, the user is always notified of the information about the flicker regardless of the amplitude of the flicker, thus preventing unnecessary execution of flickerless imaging. Therefore, the camera 1 according to the present exemplary embodiment is able to notify a user of information about the presence of a flicker without confusing the user and at the same time perform processing for reducing the influence of the flicker.

The present inventions have been described according to the above-described exemplary embodiment. However, the present inventions are not limited thereto but can be modified in diverse ways within the ambit of the appended claims. For example, although in the above-described exemplary embodiment the camera 1 displays the icon in regard to the presence of a flicker by displaying an icon "Flicker" on the display element 107, the icon to be displayed is not limited thereto and may be any icon.

Further, although in the above-described exemplary embodiment the camera 1 displays the flicker icon on the display element 107, the configuration is not limited thereto. For example, the flicker icon may be displayed on a display (not illustrated) of the camera main unit 100. Further, the flicker icon may be displayed on another display unit.

Further, although in the above-described exemplary embodiment the camera 1 displays the flicker icon to notify the user of information about the presence of a flicker, the configuration is not limited thereto. For example, the camera main unit 100 may be provided with a light emitting diode (LED) for notifying the user that a flicker is detected, and may be configured to flicker the LED to notify the user of the information about the presence of a flicker. In addition, any type of a notification unit for notifying the user of the information about the presence of a flicker may be employed.

A flicker detection method and a flickerless imaging method are not limited to the ones similar to the above-described exemplary embodiment. For example, an image may be acquired by performing charge accumulation in a comparatively long accumulation time including at least one light amount change cycle of the flickering light source, and a flicker may be detected by checking whether a luminance unevenness (striped pattern) has appeared in the relevant image. Further, when a flicker is detected, flickerless imaging may be performed by capturing the subject with a high-speed shutter at such timing that the influence of the flicker does not appear in the captured image.

Further, a sensor other than electric charge accumulation type may be employed as the light metering sensor 108. For example, a flicker may be detected by using a sensor which changes an output voltage value according to the incident light amount, and the type of a flicker may be determined based on the difference in the voltage value output from the sensor. In addition, any flicker detection method and any flickerless imaging method can be employed if they are known methods.

Although in the above-described exemplary embodiment the camera 1 performs flickerless imaging as processing for reducing the influence of a flicker, the configuration is not limited thereto. For example, when a flicker is detected, processing for reducing the influence of a flicker may be performed by processing the image acquired under an environment where the flicker has occurred. In this case, the CPU (control unit) 101 compares the amplitudes of the evaluation values F50 and F60 with the amplitude of second threshold value AntiF_Th, and performs control to determine whether to perform image processing on an acquired image according to the result of the comparison. Then, the image processing is implemented when the CPU 101 and an image processing circuit (not illustrated) perform various processing on the acquired image.

Further, both the flickerless imaging and the above-described image processing may be performed as processing for reducing the influence of a flicker. For example, when there is a large difference between the shutter speed initially set by the user and the shutter speed set in flickerless imaging, image processing for reducing the influence of a flicker may be performed based on the difference.

Although in the above-described exemplary embodiment the camera 1 notifies the user of detection of a flicker and information about the presence of a flicker based on the first threshold value F_Th, the configuration is not limited thereto. As long as the threshold value for notifying the user of information about the presence of a flicker is smaller than the threshold value for performing imaging for reducing the influence of the detected flicker, the effect of the present inventions can be achieved.

Although in the above-described exemplary embodiment the CPU 101 and the ICPU 112 operate in a collaborative way to control operations of the camera 1, the configuration is not limited thereto. For example, a program according to the above-described flowchart illustrated in FIG. 2 is pre-stored in the memory 102 or 113. Then, the CPU 101 and the ICPU 112 may execute the program to control the camera main unit 100 and the lens unit 200.

Further, processing executed by the CPU 101 and the ICPU 112 may be substituted and executed by using different units. For example, a calculation circuit (calculation unit) for calculating the above-described evaluation values (F50 and F60) in regard to a flicker and a control circuit (control unit) for controlling operations of flickerless imaging may be provided separately from the CPU 101 and the ICPU 112.

A program in any format is applicable to the present inventions. For example, an object code, a program executed by an interpreter, and script data supplied to an operating system (OS) are applicable to the present inventions as long as program functions are provided. A recording medium for supplying the program may be, for example, a hard disk, a magnetic recording medium such as a magnetic tape, and an optical/magneto optical recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-182736, filed Sep. 8, 2014, which is hereby incorporated by reference herein in its entirety.

What is claimed is:

1. An imaging apparatus comprising:
   a sensor configured to output a signal according to an incident light amount; and
   at least one processor that operates to:
   calculate an evaluation value in regard to a flicker based on the output signal from the sensor;
   notify a user of information about a presence of the flicker based on the evaluation value; and
   control processing for reducing an influence of the flicker based on the evaluation value,
   wherein, when the evaluation value is equal to or larger than a first threshold value, the at least one processor notifies the user of the information about the presence of the flicker,
   wherein, when the evaluation value is equal to or larger than a second threshold value which is larger than the first threshold value, the at least one processor performs control to carry out processing for reducing the influence of the flicker,
   wherein, when the evaluation value is equal to or larger than the first threshold value and is smaller than the second threshold value, the at least one processor performs control not to perform the processing for reducing the influence of the flicker, and
   wherein the first threshold value is different value from the second threshold value.

2. The imaging apparatus according to claim 1, wherein the at least one processor notifies the user of the information about the presence of the flicker by displaying an icon related to the presence of the flicker on a display device.

3. The imaging apparatus according to claim 1, wherein the at least one processor performs control to perform processing for reducing the influence of the flicker by performing imaging for reducing the influence of the flicker.

4. The imaging apparatus according to claim 1, wherein the at least one processor performs control to perform processing for reducing the influence of the flicker by performing image processing for reducing the influence of the flicker on an image acquired by capturing an image of a subject.

5. The imaging apparatus according to claim 1, wherein the evaluation value increases as a light amount change of the flicker based on the incident light amount entering the sensor becomes greater, and decreases as a light amount change of the flicker based on the incident light amount entering the sensor becomes smaller.

6. The imaging apparatus according to claim 1, wherein, when the evaluation value is smaller than the first threshold value, the at least one processor does not notify the user of the information about the presence of the flicker.

7. The imaging apparatus according to claim 1, wherein, when the evaluation value is smaller than the first threshold value, an absolute value of a difference between the evaluation value and the second threshold value is larger than an absolute value of a difference between the evaluation value and the first threshold value, and
   wherein, when the evaluation value is equal to or larger than the second threshold value, the absolute value of the difference between the evaluation value and the first threshold value is larger than the absolute value of the difference between the evaluation value and the second threshold value.

8. The imaging apparatus according to claim 1, wherein the sensor is a charge accumulation type sensor for outputting a signal according to the incident light amount, and
wherein the at least one processor calculates the evaluation value based on an output signal in regard to electric charges accumulated in the sensor.

9. The imaging apparatus according to claim 8,
wherein the at least one processor is further configured to detect as the flicker a light amount change in which the evaluation value is equal to or larger than the first threshold value.

10. The imaging apparatus according to claim 8, wherein the at least one processor calculates the evaluation value based on a plurality of output signals acquired through charge accumulation performed for a plurality of times by the sensor, and
wherein each of charge accumulation periods of the charge accumulation performed for the plurality of times is shorter than one cycle of a light amount change of the flicker.

11. A control method for an imaging apparatus that includes a sensor for outputting a signal according to an incident light amount, the control method comprising:
calculating an evaluation value in regard to a flicker based on the output signal from the sensor;
notifying, via at least one processor of the imaging apparatus, a user of information about a presence of the flicker based on the evaluation value; and
controlling processing for reducing an influence of the flicker based on the evaluation value,
wherein, when the evaluation value is equal to or larger than a first threshold value, the notifying notifies the user of the information about the presence of the flicker,
wherein, when the evaluation value is equal to or larger than a second threshold value which is larger than the first threshold value, the controlling controls the processing for reducing the influence of the flicker,
wherein, when the evaluation value is equal to or larger than the first threshold value and is smaller than the second threshold value, the controlling performs control not to perform the processing for reducing the influence of the flicker, and
wherein the first threshold value is different value from the second threshold value.

12. A non-transitory computer readable storage medium storing a program for causing a computer to execute a control method for an imaging apparatus that includes a sensor for outputting a signal according to an incident light amount, the control method comprising:
calculating an evaluation value in regard to a flicker based on the output signal from the sensor;
notifying, via at least one processor of the imaging apparatus, a user of information about a presence of the flicker based on the evaluation value; and
controlling processing for reducing an influence of the flicker based on the evaluation value,
wherein, when the evaluation value is equal to or larger than a first threshold value, the notifying notifies the user of the information about the presence of the flicker,
wherein, when the evaluation value is equal to or larger than a second threshold value which is larger than the first threshold value, the controlling controls the processing for reducing the influence of the flicker,
wherein, when the evaluation value is equal to or larger than the first threshold value and is smaller than the second threshold value, the controlling performs control not to perform the processing for reducing the influence of the flicker, and
wherein the first threshold value is different value from the second threshold value.

13. An imaging apparatus comprising:
a sensor configured to output a signal according to an incident light amount; and
at least one processor that operates to:
calculate an evaluation value in regard to a flicker based on the output signal from the sensor;
notify a user of information about a presence of the flicker based on the evaluation value; and
control processing for reducing an influence of the flicker based on the evaluation value,
wherein, when the evaluation value is equal to or larger than a first threshold value, the at least one processor notifies the user of the information about the presence of the flicker, and when the evaluation value is smaller than the first threshold value, the at least one processor does not notify the user of the information about the presence of the flicker,
wherein, when the evaluation value is equal to or larger than a second threshold value which is larger than the first threshold value, the at least one processor performs control to carry out processing for reducing the influence of the flicker, and when the evaluation value is smaller than the second threshold value, the at least one processor performs control not to perform processing for reducing the influence of the flicker,
wherein, when the evaluation value is smaller than the first threshold value, an absolute value of a difference between the evaluation value and the second threshold value is larger than an absolute value of a difference between the evaluation value and the first threshold value, and
wherein, when the evaluation value is equal to or larger than the second threshold value, the absolute value of the difference between the evaluation value and the first threshold value is larger than the absolute value of the difference between the evaluation value and the second threshold value.

14. A control method for an imaging apparatus that includes a sensor for outputting a signal according to an incident light amount, the control method comprising:
calculating an evaluation value in regard to a flicker based on the output signal from the sensor;
notifying, via at least one processor of the imaging apparatus, a user of information about a presence of the flicker based on the evaluation value; and
controlling processing for reducing an influence of the flicker based on the evaluation value,
wherein, when the evaluation value is equal to or larger than a first threshold value, the at least one processor notifies the user of the information about the presence of the flicker, and when the evaluation value is smaller than the first threshold value, the at least one processor does not notify the user of the information about the presence of the flicker,
wherein, when the evaluation value is equal to or larger than a second threshold value which is larger than the first threshold value, the at least one processor performs control to carry out processing for reducing the influence of the flicker, and when the evaluation value is smaller than the second threshold value, the at least one processor performs control not to perform processing for reducing the influence of the flicker, wherein, when the evaluation value is smaller than the first threshold value, an absolute value of a difference between the evaluation value and the second threshold value is larger than an absolute value of a difference between the evaluation value and the first threshold value, and wherein, when the evaluation value is equal to or larger than the second threshold value, the absolute value of the difference between the evaluation value and the first threshold value is larger than the absolute value of the difference between the evaluation value and the second threshold value.

15. A non-transitory computer readable storage medium storing a program for causing a computer to execute a control method for an imaging apparatus that includes a sensor for outputting a signal according to an incident light amount, the control method comprising:

calculating an evaluation value in regard to a flicker based on the output signal from the sensor;

notifying, via at least one processor of the imaging apparatus, a user of information about a presence of the flicker based on the evaluation value; and controlling processing for reducing an influence of the flicker based on the evaluation value, wherein, when the evaluation value is equal to or larger than a first threshold value, the at least one processor notifies the user of the information about the presence of the flicker, and when the evaluation value is smaller than the first threshold value, the at least one processor does not notify the user of the information about the presence of the flicker, wherein, when the evaluation value is equal to or larger than a second threshold value which is larger than the first threshold value, the at least one processor performs control to carry out processing for reducing the influence of the flicker, and when the evaluation value is smaller than the second threshold value, the at least one processor performs control not to perform processing for reducing the influence of the flicker, wherein, when the evaluation value is smaller than the first threshold value, an absolute value of a difference between the evaluation value and the second threshold value is larger than an absolute value of a difference between the evaluation value and the first threshold value, and wherein, when the evaluation value is equal to or larger than the second threshold value, the absolute value of the difference between the evaluation value and the first threshold value is larger than the absolute value of the difference between the evaluation value and the second threshold value.

* * * * *